United States Patent
Grönquist et al.

(10) Patent No.: US 7,371,344 B2
(45) Date of Patent: May 13, 2008

(54) METHOD AND APPARATUS FOR MANUFACTURING A BLANK FOR A ROTARY CUTTING TOOL

(75) Inventors: Mikael Grönquist, Norrköping (SE); Johnny Bruhn, Västerfärnebo (SE); Mattias Svensson, Skärblacka (SE)

(73) Assignee: Seco Tools AB, Fagersta (SE)

( * ) Notice: Subject to any disclaimer, the term of this patent is extended or adjusted under 35 U.S.C. 154(b) by 0 days.

(21) Appl. No.: 10/857,499

(22) Filed: Jun. 1, 2004

(65) Prior Publication Data

US 2005/0047951 A1 Mar. 3, 2005

(30) Foreign Application Priority Data

Jun. 4, 2003 (SE) .................... 0301617
Jun. 19, 2003 (SE) .................... 0301828

(51) Int. Cl.
- B22F 1/00 (2006.01)
- B22F 3/00 (2006.01)
- B23B 51/00 (2006.01)
- B21K 5/04 (2006.01)

(52) U.S. Cl. .................... 419/41; 408/230; 76/108.6; 425/78

(58) Field of Classification Search .................. 419/41; 425/78; 72/260, 264; 408/230; 76/108.6
See application file for complete search history.

(56) References Cited

U.S. PATENT DOCUMENTS

| | | | |
|---|---|---|---|
| 4,704,055 A * | 11/1987 | Guhring | 408/59 |
| 4,779,440 A * | 10/1988 | Cleve et al. | 72/260 |
| 5,438,858 A | 8/1995 | Friedrichs | |
| 5,601,857 A * | 2/1997 | Friedrichs | 425/381 |
| 5,780,063 A * | 7/1998 | Friedrichs | 425/131.1 |
| 5,904,939 A * | 5/1999 | Friedrichs | 425/381 |
| 6,248,277 B1 * | 6/2001 | Friedrichs | 264/167 |
| 6,283,682 B1 * | 9/2001 | Plummer | 408/57 |
| 6,402,439 B1 * | 6/2002 | Puide et al. | 408/144 |
| 6,450,739 B1 * | 9/2002 | Puide et al. | 408/144 |
| 6,655,882 B2 * | 12/2003 | Heinrich et al. | 408/144 |
| 6,669,414 B1 * | 12/2003 | Puide et al. | 408/144 |
| 6,699,430 B2 * | 3/2004 | Friedrichs | 419/3 |
| 7,101,167 B2 * | 9/2006 | Puide et al. | 425/381 |
| 2002/0029910 A1 * | 3/2002 | Heinrich et al. | 175/394 |

FOREIGN PATENT DOCUMENTS

| | | | |
|---|---|---|---|
| GB | 2218931 A | * | 11/1989 |
| JP | 3309860 A | * | 3/1983 |
| JP | 11236602 A | * | 8/1999 |
| WO | WO93/20961 | * | 10/1993 |
| WO | WO 98/28455 | | 7/1998 |
| WO | WO 00/74870 A1 | | 12/2000 |

* cited by examiner

Primary Examiner—Susy Tsang-Foster
Assistant Examiner—Nicholas A. Smith
(74) Attorney, Agent, or Firm—Drinker Biddle & Reath LLP

(57) ABSTRACT

A blank for a rotary tool for chip removing machining, such as a helix drill or an end mill is formed by advancing a mixture of hard metal powder and carrier through an extrusion passage. The mixture is fed past a core having pins secured thereto for forming respective internal holes through the mixture. Then the mixture is advanced through a rotary part that is rotating about a center axis of the extrusion passage, wherein the rotary part and the internal holes become twisted to a predetermined pitch. The mixture is also advanced past a plurality of shaping parts which project transversely into the extrusion passage for shaping exterior chip flutes in the mixture, e.g., by embossing or cutting. The mixture is allowed to harden into a green body, and the green body is then sintered to form a blank.

13 Claims, 5 Drawing Sheets

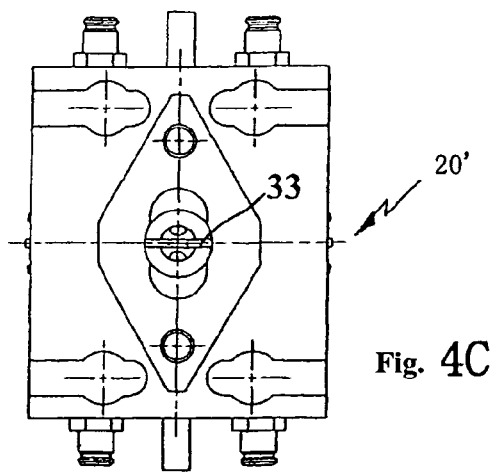
Fig. 4C
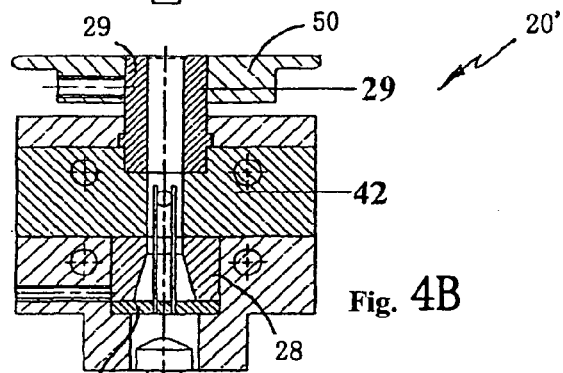
Fig. 4B
Fig. 3
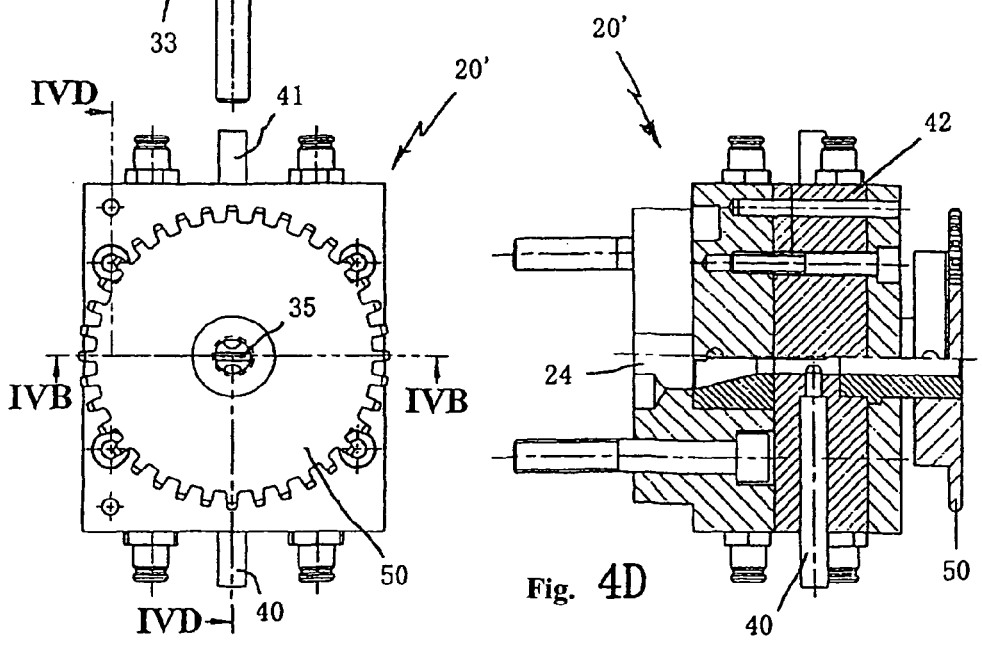
Fig. 4A
Fig. 4D

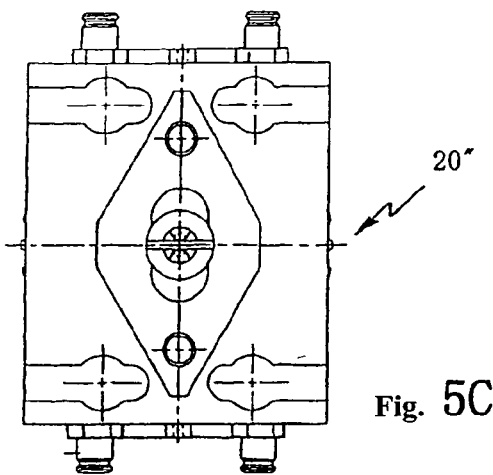
Fig. 5C
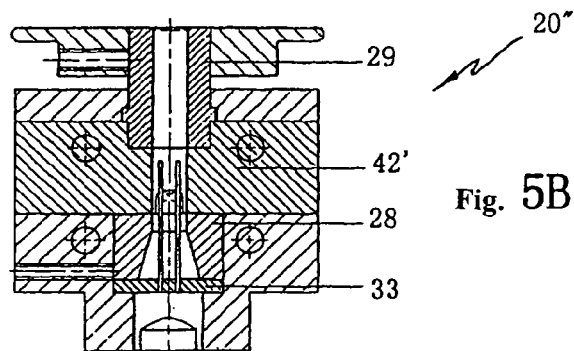
Fig. 5B
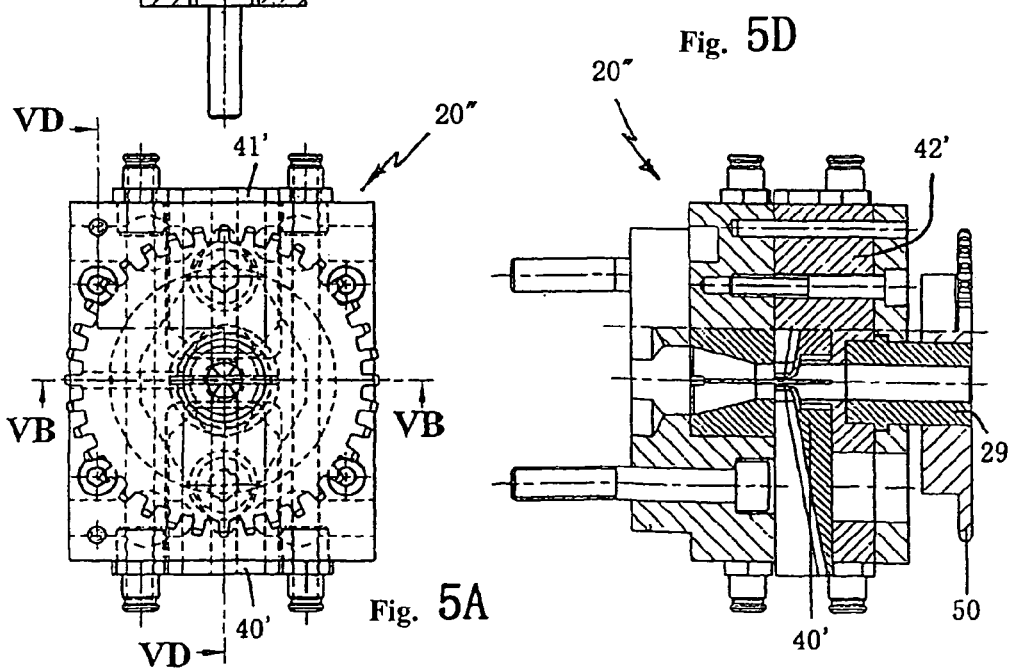
Fig. 5D
Fig. 5A

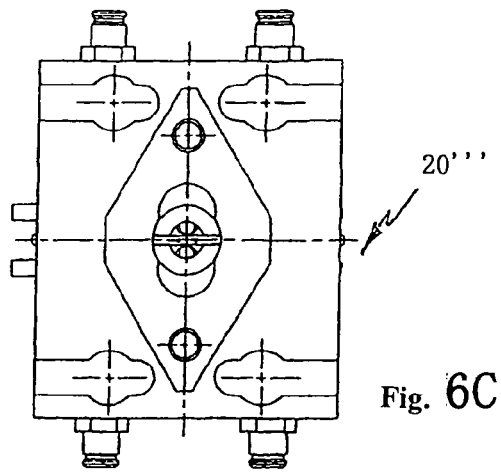
Fig. 6C
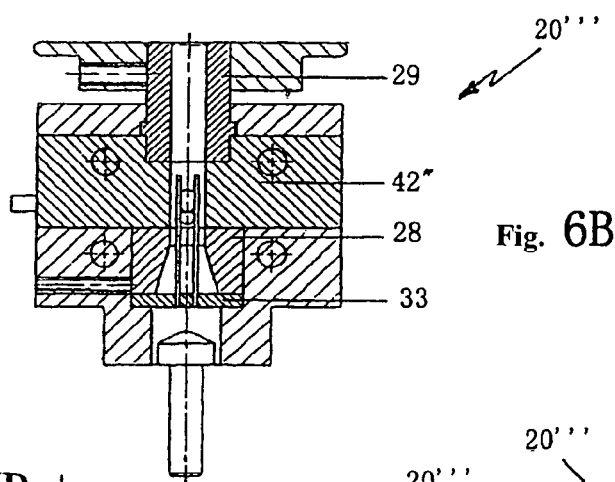
Fig. 6B
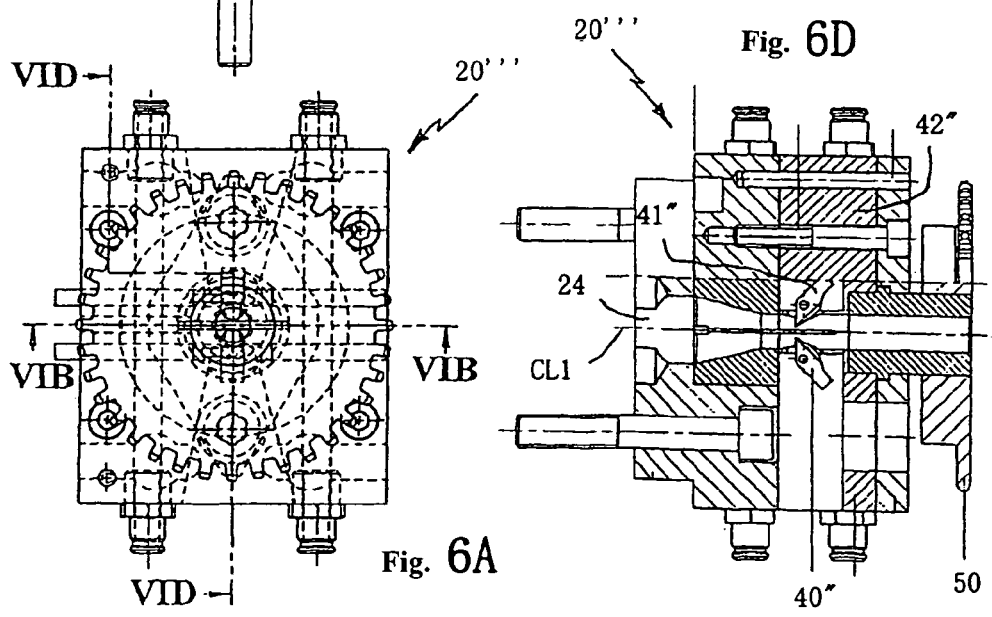
Fig. 6A
Fig. 6D

METHOD AND APPARATUS FOR MANUFACTURING A BLANK FOR A ROTARY CUTTING TOOL

This application is based on and claims priority under 37 U.S.C. §119 with respect to Swedish Applicaiton Nos. 0301617-7 and 0301828-0 filed on Jun. 4 and 16, 2003, respectively, the entire contents of which are incorporated herein by reference.

BACKGROUND OF THE INVENTION

The present invention relates to a method and a device for manufacturing a blank for a rotary tool as well as to a rotary tool made by the method.

PRIOR ART

It is previously known through for example WO 98/28455 to press material powder, such as tungsten carbide (WC) together with cobalt (Co), between a punch and a die, and subsequently to sinter the material such that the binder metal is melted and binds the carbides to form tool material for chip removing machining. The known technique brings about a plurality of drawbacks. The powder give off dust and the formed green body (pressed but not sintered material) will not endure handling to any degree. Furthermore the chip flutes must be ground and the method requires time and energy. The problems have partly been solved by injection moulding of cemented carbide mixed in a carrier such as indicated in SE-B-9501687-9. The method of injection moulding brings a high degree of freedom concerning geometry but brings costly investments in moulds.

It is previously known through for example U.S. Pat. No. 4,779,440 and WO/0074870 to extrude a blank for a helix drill. The extruded blank has chip flutes with uniform pitch along the circumference of the blank. The blank also has internal flush channels that can be formed, for example by elastic threads situated within the die and within the material being extruded, as disclosed for instance in U.S. Pat. No. 5,438,858. In tests performed using such elastic threads, the channels that were formed exhibited poor position tolerances within the blank. That means that there is a risk that the channels could encroach on chip flutes and cutting edge areas.

OBJECTS AND SUMMARY OF THE INVENTION

One object of the present invention is to provide a method and a device, whereby varying pitch of the flush channels can be obtained.

Another object of the present invention is to provide a method and a device, whereby the lengths and pitch of the chip flutes can be decided.

Another object of the present invention is to provide a tool with varying pitch.

These and other objects have been achieved by a method for manufacturing a blank for a rotary tool for chip-removing machining. The method comprises the steps of:
A. mixing a hard metal powder and a carrier,
B. inserting the mixture into an extrusion machine in which the mixture is heated to a temperature rendering the mixture flowable,
C. advancing the flowable mixture in a feed direction through an extrusion passage and past a core having pins secured thereto for forming respective internal holes through the mixture, thereafter
D. advancing the mixture through a rotary part that is rotating about a center axis of the extrusion passage, wherein friction between the mixture and the rotary part causes the mixture to be twisted, whereby the internal holes become twisted to a predetermined pitch, thereafter
E. allowing the mixture to solidify and form a green body, and
F. sintering the green body to form a blank.

Preferably, subsequent to step C and prior to step D, the mixture is advanced past a plurality of shaping parts projecting transversely into the extrusion passage for shaping exterior chip flutes in the mixture.

An apparatus aspect of the invention for making a green body for a tool for chip removing machining, comprises a housing in which are mounted a die and a rotary part together forming an extrusion passage for conducting a flowable mixture. The rotary part is rotatable about a center axis of the extrusion passage. A core is mounted in the nozzle and carries pins disposed in the extrusion passage for forming respective internal holes through a mixture being conducted. The pins terminate axially short of the rotary part.

Preferably, a plurality of shaping parts are provided having respective internal ends that can project transversely into the extrusion passage upstream of the rotary part for shaping flutes in a mixture being conducted.

DESCRIPTION OF THE DRAWINGS

The objects and advantages of the invention will become apparent from the following detailed description of preferred embodiments thereof in connection with the accompanying drawings, in which like numerals designate like elements and in which:

FIG. 3 shows an elongated green body in a perspective view.

FIG. 4A shows a first alternative fabrication device according to the present invention for generation of elongated green bodies, in a front view.

FIG. 4B shows the device in cross section according to line IIB-IIB in FIG. 4A.

FIG. 4C shows the device in an end view. FIG. 4D shows the device in cross section according to the line IID-IID in FIG. 4A.

FIG. 5A shows a second alternative fabrication device according to the present invention for generation of elongated green bodies, in a front view.

FIG. 5B shows the device in cross section according to the line IIB-IIB in FIG. 5A.

FIG. 5C shows the device in an end view. FIG. 5D shows the device in cross section according to the line IID-IID in FIG. 5A.

FIG. 6A shows a third alternative fabrication device according to the present invention for generation of elongated green bodies, in a front view.

FIG. 6B shows the device in cross section according to line IIB-IIB in FIG. 6A.

FIG. 6C shows the device in an end view.

FIG. 6D shows the device in cross section according to the line IID-IID in FIG. 6A.

DETAILED DESCRIPTION OF PREFERRED EMBODIMENTS

Figures 1A, 1B, 1C, 1D, 1E:
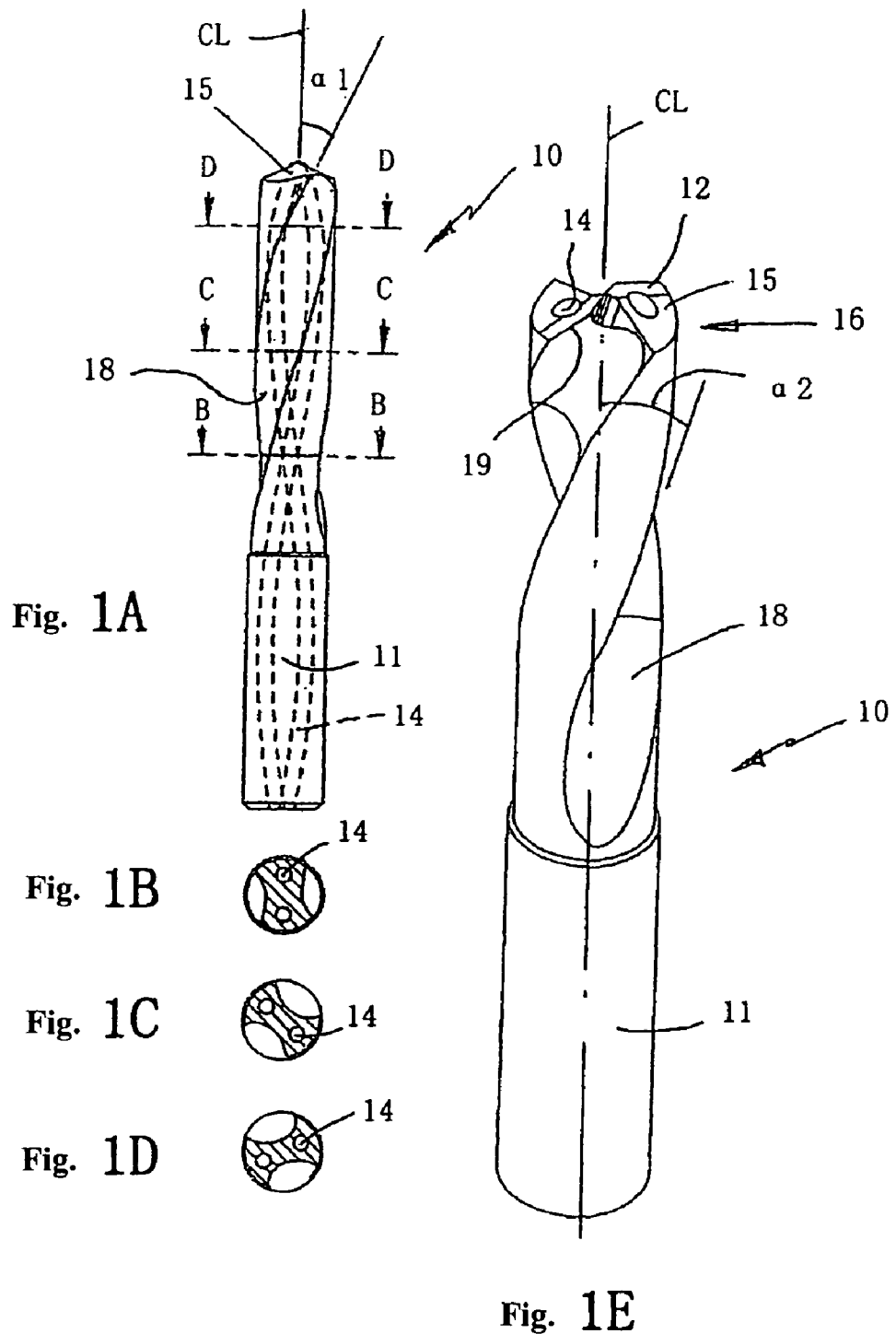
FIG. 1A shows schematically a drill in a side view.
FIGS. 1B, 1C and 1D show radial cross sections according to lines B-B, C-C, D-D, respectively in FIG. 1A.
FIG. 1E shows the drill in a perspective view.

The embodiment of a tool according to invention shown in FIGS. 1A-1E is a so-called helix drill. The drill 10 is made in solid hard material, such as for example extruded cemented carbide, and includes helical chip flutes 18 and these can extend through the entire body or through a part thereof. The drill has a shank 11 to be secured to a rotary spindle, not shown. The drill has two upper clearance surfaces 15. All surfaces and associated edges are made from the same material, i.e. preferably in extruded cemented carbide. Lines of intersection of the chip flutes 18 and the clearance surfaces 15 form main cutting edges 19 at the cutting end of the drill, preferably via reinforcing chamfers 12. The entire length of the drill is chosen from 3 to 10 times its diameter.

Two flush channels 14 extend through the entire drill to transfer flushing medium from the spindle to the tip of the drill. A diametrical groove can be provided at the shank end to inter alia counteract obstruction of the holes.

Both the flushing channels 14 and the chip flutes 18 have varying pitch. The variation of the pitch of the, for example two, flushing channels 14 are preferably substantially identical. The variation of the pitch of the, for example two, chip flutes 18 are preferably substantially identical. The variation of the pitch of the flushing channels 14 and of the chip flutes 18 are preferably substantially identical. The pitch is such that the axial angle α1 relative to the center line CL of the drill at its cutting end 16 is larter than the axial angle α2 at the axial mid-point of the chip flutes. For example the axial angle can vary between 5 and 20° from its cutting end 16 to the axially inner end 17 of the chip flute.

This drill can be made via one of at least four different methods. The unit "mm/revolution" defines the pitch. The pitch p is proportionally inverted relative to the axial angle α according to this formula:

$$D*\pi/\tan \alpha = p,$$

where D is the diameter of the drill in millimeter, and p is the pitch in millimeter. Example: A drill with D 10 mm and a 30° axial angle in a radial cross section gives the pitch 10*3.14/tan(30°)=54.4 mm.

The axial angle for the axially forward part of the drill lies within the interval of 20°-45° and for the rear part of the drill between 5° and 25°. The axial angle for the drill in the shown embodiment is 31° at the cutting end 16 and 16° at the axially inner end 17.

By providing the axial angles according to the described geometry, low cutting forces are obtained when drilling through the relatively large rake angle at the end 16 as well as an efficient chip flow by means of a relatively small axial angle at axially rearwardly along the chip flutes. In addition, the varying pitch of the flushing channels 14 in the drill 10 implies that the exits of the channels can be placed where they give most effect for the drilling process without influencing the area of for example grinding of chip flutes.

Figure 2B:
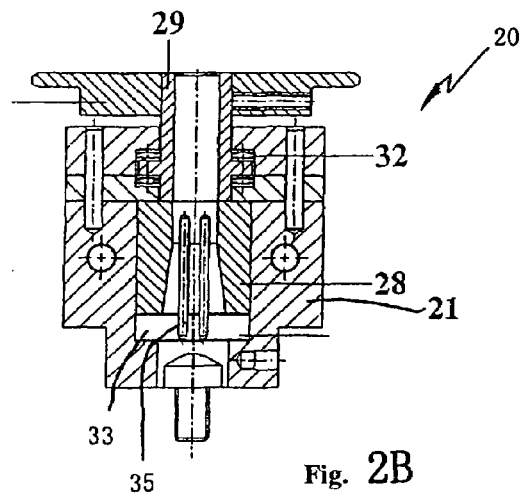
FIG. 2B shows the device in cross section according to the line IIB-IIB in FIG. 2A.
Figure 2A:
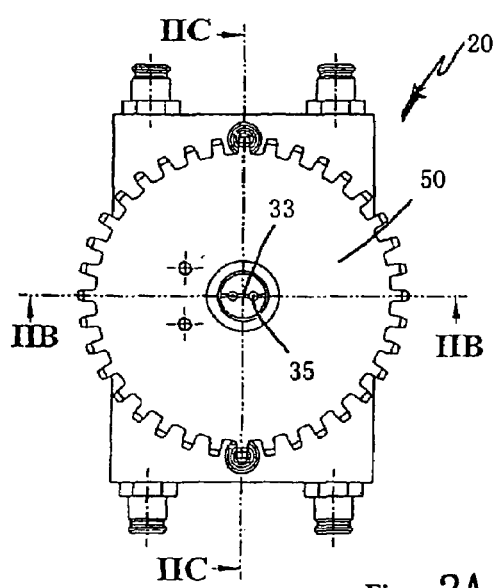
FIG. 2A shows a fabrication device according to the present invention for generation of elongated green bodies, in a front view.
Figure 2C:
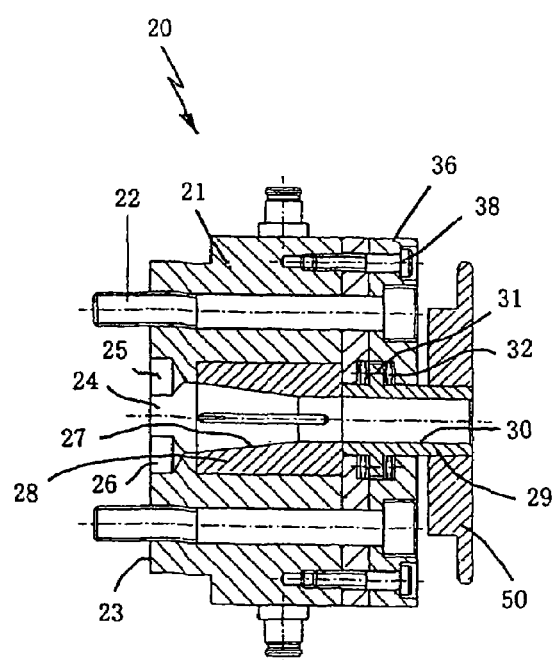
FIG. 2C shows the device in cross section according to the line IIC-IIC in FIG. 2A.

In FIGS. 2A-2C an embodiment of a fabrication device 20 according to the present invention for generation of elongated cylindrical green bodies is shown. By the term "green body" is here meant an extruded but not sintered body, while the term "blank" relates to a sintered body. It should be noted that the term "green" does not relate to the colour of the body but relates to an extrudate.

The device 20 comprises a rectangular steel housing 21, which is intended to be fastened with for instance bolts to an extrusion machine, not shown. The housing 21 has two bolts 22 to be fastened in the machine and has a rear surface 23 intended to seal against said machine. The housing has a central through-going recess or extrusion passage 24 through which a mixture will be pressed. The recess 24 is widened in connection to the rear surface 23 to form spaces 25, 26 for receiving the ends of feed worms (screws) of the extrusion machine, see FIG. 2C. The recess 24 transforms into a diameter reducing restriction 27 in a circular nozzle 28. The nozzle 28 is made from a wear resistant material such as cemented carbide. The recess 24 then continues via a cylindrical inner, centrally positioned hole 30 of a cylindrical die 29, which is provided next to and in connection with the nozzle 28.

The die 29 is substantially cylindrical and comprises a radially external flange 31, which is intended to cooperate with axial bearings 32 in a lid 36. The external end of the die 29 is provided with a rotational device or a pinion 50, which is rigid with the die. The pinion is intended to be rotated by a cog-wheel, not shown. The die 29 can thereby be rotated a infinite number of revolutions together with the pinion 50. The principal feed direction F of the mixture is left-to-right in FIG. 2C. A bar-shaped core 33 is mounted in the die 28 within the extrusion passage 24. The core is rectangular and contains two elongate rigid pins 35. The pins can be made from steel. The pins 35 are intended to project from the core in the feed direction F to form flush channels in the green body. The recess 24 ends in an open hole in the outer end of the die. The device according to the present invention consequently comprises a rigid nozzle part 28 and a rotatable die part 29.

The drill or the end mill is manufactured as follows. Hard metal powder having a certain cobalt content and a carrier, for example a polymer or a plastic, is mixed and shaped to pellets or granulates. The content of binder lies within the interval of 1-10 percent by weight. The expression "cobalt" shall here be understood as a metallic binder that alternatively can be exchanged for or include other metals, for example nickel, Ni. Subsequently the mixture is preheated to a temperature suitable for the mixture and is inserted in a machine for extrusion. Then the mixture is pressed at certain pressure and certain temperature, about 180° C., that is considerably lower than at prior art where the melting temperature of cobalt is required, into the extrusion pasasge 24 by means of two feed worms. The restriction 27 will further compress the mixture or mass. Then the hot mixture reaches the core 33 and passes along each side thereof through the two substantially semi-circular openings formed about the core. Rearwardly of the core in the feed direction F the mixture fuses again to a cylindrical body except where the pins 35 form spaces in the body, which later will constitute flush channels. The pins are chosen long enough to allow the mixture to cool such that re-fusion is avoided. The pins 35 do not reach the rotating part 29, i.e. the rigid pins 35 aterminate axially short of the rotating die 29. Subsequently the mixture reaches the space 30, and the mixture is brought to rotate by friction between the mixture and the bore wall of the rotating die. Thereby, a cylindrical green body is attained, the flushing channels of which can be given a varying pitch by varying the rotary speed of the die. Then chip flutes are sintered and ground with substantially the same varying pitch as that of the flushing channels.

Thus, at extrusion of the green body the mixture is fed into the device that comprises a rigid and a rotatable part. By first being able to shape a green body with flushing holes and then twist the body in one and the same device has definitive advantages. A great advantage with this technique is that green bodies can be extruded with either straight or twisted flushing holes in one and the same device, which gives better economy. Another advantage with this technique is however that a compact solution for the manufacture of twisted green bodies is attained. Thereby bulky and expensive equipment is avoided that otherwise would be required for gripping the green body from the outside and then twisting it. The finished green body consequently has been extruded and has obtained entirely or partly twisted flushing holes that also may have varying pitch. The shaping that is plastic, occurs with the aid of a tool that comprises a rigid and a rotatable part. The mixture is fed into in the rigid part of the tool where it is compressed around a fixed core in order to be shaped to a green body with flushing holes. In the next moment the mixture is further fed into in the rotatable part of the tool the driving of which is synchronized with the control system of the machine. The rotatable part has a die that compresses the mixture further and the friction between the mixture and the wall of the hole 30 forces the green body to be twisted. The rotational speed of the die thereby influences the pitch of the flushing holes, which means that green bodies with flushing holes that have varying pitch can be extruded. The greatest advantage with this technique is that one in a very simple manner can influence the pitch of the flushing holes by changing the rotational speed of the die. The varying pitch is attained by changing the rotational speed of the die under controlled conditions during the process. Also the chip flutes must be created by grinding with corresponding pitch at a blank with chip flutes having varying pitch. With regard to drilling in certain materials a drill which has chip flutes of varying pitch can be a better product.

In FIGS. 4A-4D is shown an alternative embodiment of a device 20' according to the present invention for manufacture of elongated green bodies with external grooves such as is shown in FIG. 3. What distinguishes this device 20' from the device 20 is foremost that the device 20' comprises a portion 42 provided at the same axial point as the ends of the pins 35, which portion 42 comprises two movable parts 40, 41 that project radially into the cores in order to emboss chip flutes in the green body. Each movable part 40, 41 comprises a bar having an inner rounded end, which end is symmetrically shaped. The bar slides in a hole in the part 42. A shoulder 40' is provided on the bar in the vicinity of the rounded end. The shoulder is intended to cooperate with a shoulder in the hole in order to obtain the correct projection of the rounded end into the extrusion passage. During extrusion of current green bodies the extrudate is fed into the device and passes in this case first cores 33, 35 that shape flushing holes. In the next phase the extrudate is compressed in order to again be homogenized after partition at the core. The extrudate now passes the part in the device where the plastic shaping of the chip flutes occur. The two cylindrical cores or movable parts 40, 41, each having one end shaped according to the desired chip flute profile, are assembled at suitable partition, for example 180°, in the device. Said one end is preferably rounded. The cores 40, 41 bottom-out in the device at full chip flute depth and are coupled to suitable control and automatic engineering, not shown, outside of the device. After the chip flutes reach the desired chip flute length, the cores are pulled back and the extrudate reverts to the roundness that is necessary to shape the drill shank. After formation of the chip flutes the extrudate is pressed further into a rotatable part of the device, which through friction twists the extrudate and thus also the chip flutes. The rotational speed determines what pitch the chip flutes attain. It also becomes possible to combine straight and twisted chip flutes in one and the same blank that results in better products.

In FIGS. 5A-5D is shown an alternative embodiment of a device 20" according to the present invention for generation of elongated green bodies with external grooves such as is shown in FIG. 3. What distinguishes this device 20" from the device 20' is foremost that each of the two movable parts 40', 41' of the portion 42' comprises an inner end provided with a cutting edge that projects transversely (preferably radially) into the extrusion passage. The profile of the cutting edge is the same as the desired chip flute profile. Each movable part has a chip space of its own that runs from the center of the cutting insert, through the movable part, and out from the device. The profile of the cutting edge and the motion of the movable part make that the chip flute profile in the extrudate is changed in pace with the cutting depth. If desired also the cutting insert can be developed such that the profile of the chip flute does not vary with the cutting depth. This means that green bodies with varying chip flute depth and profile can be extruded, which results in improved products. Furthermore, optimal ends of the chip spaces can be obtained which is not always the case with the device 20'. The extrudate gives in this situation green bodies with straight chip flutes and flushing holes. In the last phase of the device the extrudate is finely calibrated and is pressed further into a rotatable die 29 that twists chip flutes and flushing holes to desired pitch.

In FIGS. 6A-6D is shown an alternative embodiment of a device 20''' according to the present invention for generation of elongated green bodies with external grooves such as is shown in FIG. 3. What distinguishes this device 20" from the device 20' is foremost that the two movable parts constitute cutting inserts 40", 41" mounted on the portion 42". Each cutting insert 40", 41" comprises an inner end provided with a cutting edge that projects transversely into the extrusion passage. Two cutting inserts, or more, at suitable spacing are assembled on respective shafts 50 which makes it possible to pivot. The shafts terminate on the upper side of the tool and is coupled to suitable control and automatic engineering. The noses of the cutting inserts have the desired chip flute profile at a 45° angle, relative to the center line CL1 of the recess, and when the extrudate passes the cutting inserts, material is machined and chip flutes are formed. Machined material leaves the device by means of the chip flutes of the tool. The lower side of each cutting insert has the same radius as the green body, which means that when the cutting inserts pivot back (i.e., are retracted), the device seals tightly as if no cutting insert were present. With the cutting inserts in this retracted position, the shaping of the chip flutes ceases and the extrudate maintains the roundness that is necessary to shape cylindrical drill shanks. The combination of features wherein: (a) material is machined, instead of being deformed to form chip flutes, and (b) the machining occurs when the extrudate is in a hot condition, i.e., is nearly a green body, results in better products.

When the green body travels past the movable parts it cools quickly due to the surrounding temperature, and the green body continues to extrude until the chip flute is sufficiently long. The length of the green body is determined by how long the extrusion is continued. The solidified green body can then be cut or simply be broken, for example by hand, in suitable lengths in interval of 5-10 times its diameter.

When the green body has been removed from the extrusion machine it is heated in a separate furnace such that the carrier is burned off and such that the binder metal melts and binds the carbides, such that a blank is formed. Then further machining of the blank takes place, such as for example grinding of edge portions, shank portion and clearance surfaces.

With the present method and device a tool can be produce whereby varying pitch can be obtained both for flush channels and chip flutes. The mixture is allowed pass a rotatable part 29 after the formation of the spaces in the green body. This means that the method according to the present invention creates the spaces before rotation occurs. The advantage therefrom in both the method and the device according to the present invention is that economically advantageous modular structural design can be utilized since the portions 42, 42' and 42" easily can be mounted without interference from the rigid pins 35.

The invention is in no way limited to the above described embodiments but can be varied freely within the scope of the appended claims. Thus the invention can be used also for solid end mills. The tool can be coated with layers of for example Al2O3, TiN and/or TiCN.

What is claimed is:

1. A method for manufacturing a blank for a rotary tool for chip removing machining, comprising the steps of:
   A) mixing a hard metal powder and a carrier,
   B) inserting the mixture into an extrusion machine in which the mixture is heated to a temperature rendering the mixture flowable,
   C) advancing the flowable mixture in a feed direction through an extrusion passage and past a core having rigid pins secured thereto for forming respective internal holes through the mixture, thereafter
   D) advancing the mixture through a rotary part that is rotating about a center axis of the extrusion passage, wherein friction between the mixture and the rotary part causes the mixture to be twisted, whereby the internal holes become twisted to a predetermined pitch, thereafter
   E) allowing the mixture to solidify and form a green body, and
   F) sintering the green body to form a blank.

2. The method according to claim 1, further including, subsequent to step C, and prior to step D, the step of advancing the mixture past a plurality of shaping parts projecting transversely into the extrusion passage for shaping exterior chip flutes in the mixture.

3. The method according to claim 2, wherein the shaping is performed by embossing.

4. The method according to claim 2, wherein the shaping is performed by cutting.

5. The method according to claim 2, further comprising the step of retracting the shaping parts out of the extrusion passage for terminating the shaping of chip flutes in the mixture as the mixture continues to be advanced through the extrusion passage.

6. The method according to claim 1, wherein the blank is a helix drill blank.

7. The method according to claim 1, wherein the blank is an end mill blank.

8. Apparatus for making a green body for a tool for chip removing machining, the apparatus comprising a housing in which are mounted a die and a rotary part together forming a extrusion passage for conducting a flowable mixture; the rotary part being rotatable about a center axis of the extrusion passage; a core mounted in a nozzle and carrying rigid pins disposed in the extrusion passage for forming respective internal holes through a mixture being conducted, the rigid pins terminating axially short of the rotary part.

9. The apparatus according to claim 8, further including a plurality of shaping parts having respective inner ends projecting transversely into the extrusion passage upstream of the rotary part for shaping chip flutes in a mixture being conducted.

10. The apparatus according to claim 9, wherein the inner ends of the shaping parts are retractable out of the extrusion passage.

11. The apparatus according to claim 10, wherein the shaping parts comprise embossing members.

12. The apparatus according to claim 10, wherein the shaping parts comprise cutting members.

13. The apparatus according to claim 9, wherein a location of the inner ends of the pins along the axis of the extrusion passage corresponds to a location of downstream ends of the pins.

* * * * *